United States Patent Office 3,476,742
Patented Nov. 4, 1969

3,476,742
CYCLIC ETHERS OF CARDENOLIDE
DIGITOXOSIDE
Wolfgang Voigtlander, Viernheim, Hesse, Fritz Kaiser, Lampertheim, Hesse, and Wolfgang Schaumann and Kurt Stach, Mannheim-Waldhof, Germany, assignors to C. F. Boehringer & Soehne G.m.b.H., Mannheim-Waldhof, Germany, a corporation of Germany
No Drawing. Filed Nov. 29, 1967, Ser. No. 686,691
Claims priority, application Germany, Dec. 15, 1966, B 90,312
Int. Cl. C07c 173/00; A61k 27/00
U.S. Cl. 260—210.5                                  7 Claims

ABSTRACT OF THE DISCLOSURE

There is disclosed a novel class of compounds constituting therapeutic agents of use in the treatment of cardiac disorders and in particular in the treatment of cardiac insufficiency. The novel compounds are cyclic ethers of cardenolide digitoxoside and correspond to the following formula:

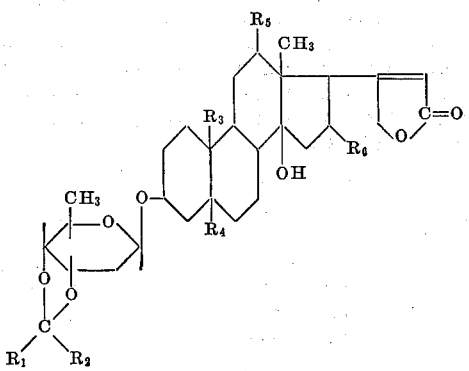

wherein $R_1$ is hydrogen or lower alkyl, $R_2$ is lower alkyl, alkenyl or alkynyl, $R_3$ is methyl, aldehyde, methylol or acylated methylol, $R_4$ is hydrogen or hydroxyl, and $R_5$ and $R_6$ are each hydrogen, hydroxyl or lower acyloxy.

There are also disclosed novel compositions containing the cyclic ethers of cardenolide digitoxoside as active ingredient as well as methods of making and using the novel cyclic ethers.

---

This invention relates to novel cyclic ethers of cardenolide digitoxosides, more particularly this invention relates to novel ethers of cardenolide digitoxosides having therapeutic properties, compositions containing the same as active ingredient and methods of making and using these cyclic ethers.

The cyclic ethers according to the present invention are compounds of the formula:

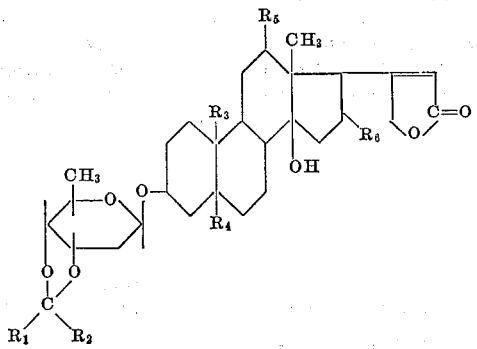

(I)

wherein $R_1$ is hydrogen or lower alkyl, $R_2$ is lower alkyl, alkenyl or alkynyl, $R_3$ is methyl, aldehyde, methylol or acylated methylol, $R_4$ is hydrogen or hydroxyl and $R_5$ and $R_6$ which may be the same or different, are each hydrogen, hydroxyl or lower acyloxy.

Thus, the new compounds according to the present invention include, inter alia, monodigitoxosides of strophanthidine, strophanthidol, gitoxigenin, 16-acyloxy-gitoxigenin (e.g. gitaloxigenin and oleandrigenin), digoxigenin, diginatigenin and digitoxigenin, in which the two free hydroxyl groups in 3',4'-position of the digitoxose are joined together by the formation of cyclic acetals or ketals.

In the cardenolide digitoxoside group of compounds, tridigitoxosides play an important part in the oral treatment of cardiac insufficiency with Digitalis glycosides. Examples of such tridigitoxoside compounds include digoxin, acetyl-digoxin, digitoxin and acetyl-digitoxin. Hitherto, the monodigitoxosides have not been used in oral cardiac therapy. Thus, for example, it is known that strophanthidine digitoxoside (helveticoside) and its reduction product strophanthidol digitoxoside (helveticosol) produce in the case of intravenous administration in animal experiments and in the case of humans, a very strong action which is comparable with strophanthine but that, in precisely the same way as strophanthine, they are only very slightly active when administered orally. In the same way, in the case of, for example, gitoxigenin digitoxoside, only a very low resorption can be detected in animal experiments. Therefore, all of the aforesaid glycosides cannot be used for oral administration.

In accordance with the invention it has now surprisingly been found that the ketals and acetals of these poorly resorbable cardenolide digitoxosides possess an outstanding enteral effectiveness and that even a relatively readily resorbable glycoside, such as lanadoxin (16-formyl-gitoxigenin digitoxoside) also undergoes a detectable increase in resorption. Thus, digitoxosides which were previously useless for oral administration are now made available for oral therapy of cardiac insufficiency. In particular, the ketals and acetals of helveticoside and helveticosol can be used as "oral strophanthines."

The cyclic ethers (I) of the present invention can be prepared, for example, by reacting in the conventional manner, a cardenolide digitoxoside having the formula:

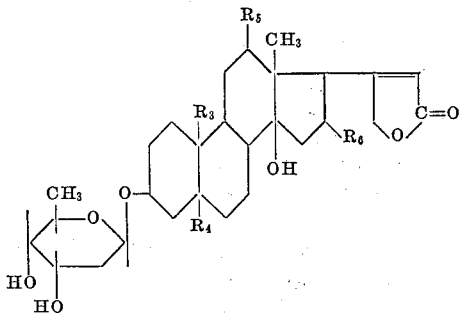

(II)

wherein $R_3$, $R_4$, $R_5$ and $R_6$ have the same significance as given above, with an aldehyde or ketone of the formula:

(III)

wherein $R_1$ and $R_2$ have the same significance as given above, or with a reactive derivative thereof, in the presence of a suitable catalyst and when $R_3$ is an aldehyde group, this can be, if desired, subsequently reduced to a methylol radical and when $R_3$ is methylol radical and/or $R_5$ and/or $R_6$ is a hydroxyl group, if desired, acylation can be subsequently carried out with a reactive derivative of a lower carboxylic acid.

As catalysts, there can, in principle, be used all of the catalysts conventionally employed for the preparation of cyclic acetals and ketals. However, they should not be so strongly acidic that they split the digitoxosides. Freshly melted zinc chloride and anhydrous copper sulfate have proved to be especially useful, as, has also, anhydrous calcium sulfate (for example, "Drierite") and phosphorylated cellulose preparations (for example, the "MN-cellulose power 300 G/P" used in thin layer chromatography).

As aldehydes and ketones (III), there can, in principle, be used all of the saturated and unsaturated, straight and branched-chain lower aldehydes and ketones and preferably those having not more than 7 carbon atoms, i.e., those in which $R_1$ and $R_2$ together contain up to 6 carbon atoms.

As reactive derivatives of the compounds (III), it is particularly preferred to use the polymeric and oligomeric aldehydes, the lower dialkyl-ketals and -acetals and the diacyl derivatives.

In carrying out the preparation of the novel cyclic ethers (I) according to the present invention, the compound (II) is preferably dissolved in an excess of the ketone or aldehyde (III), mixed with the catalyst and then allowed to stand either for a comparatively long time at ambient temperature or for a correspondingly shorter time at an elevated temperature (for example 40–60° C). In order to avoid the autoxidation of the compound (II), it is advantageous to add small amounts of an anti-oxidant, such as for instance hydroquinone, to the reaction mixture.

The subsequent reduction of the aldehyde group to the methylol group is preferably carried out by the procedure described in German Patent No. 1,114,188, for example, with a complex metal hydride such as sodium borohydride or aluminum isopropylate.

Primary or secondary hydroxyl groups which may be present in the compounds (I) which are thereby obtained ($R_3$=methylol; $R_5$ and/or $R_6$=hydroxyl) can, if desired, be thereafter acylated using therefor any of the acylation agents conventional in the chemistry of the cardiac glycosides, such as acid anhydrides, acid halides and acid imidazolides. However, reaction conditions should be avoided in which the compounds (I) come into contact with mineral acids or other strong aqueous acids since the digitoxosides would thereby be split.

The isolation of the desired products (I) from the reaction mixture takes place in the conventional manner. Mixing the reaction mixture with water and thereafter extracting it with a chlorinated hydrocarbon, such as chloroform, has proved to be particularly advantageous. Sometimes the concentrated extracts only crystallize after chromatographic purification.

The following examples show in greater detail how the invention may be carried out in several of its modifications.

Example 1.—3′,4′-isopropylidene-helveticoside

Variant a.—1 g. helveticoside (strophanthidine-β-digitoxoside) and 10 mg. hydroquinone were dissolved in a solution of 400 mg. zinc chloride in 12 ml. acetone. Thereafter the reaction mixture was allowed to stand for 3 days at ambient temperature. The reaction mixture was then diluted with water, extracted with chloroform, the chloroform phase evaporated in a vacuum and the residue recrystallized from chloroform-ether. There were thusly obtained 860 mg. 3′,4′-isopropylidene-helveticoside having a melting point of 207–211° C.

Variant b.—1 g. helveticoside, 10 mg. hydroquinone and 3 g. anhydrous copper sulfate were shaken for 3 days at ambient temperature in 50 ml. acetone, filtered, concentrated and fractionated over silica gel using benzene-ethyl acetate. The resulting benzene-ethyl acetate (1:1) fractions yielded, after recrystallization of the evaporation residue from chloroform ether, 740 mg. 3′,4′-isopropylidene-helveticoside having a melting point of 206–210° C.

Example 2.—3′,4′-isobutylidene-helveticoside 1 g. helveticoside, 10 mg. hydroquinone and 6 g. zinc chloride were dissolved in 50 ml. methyl ethyl ketone. After standing for 5 days at room temperature, the reaction mixture was diluted with water, extracted with chloroform, concentrated and fractionated over silica gel using benzene-ethyl acetate. Crystallization of the product obtained from chloroform-ether yielded 680 mg. 3′,4′-isobutylidene-helveticoside having a melting point of 181–184° C.

Example 3.—3′,4′-isopentylidene-helveticoside 1 g. helveticoside and 10 mg. hydroquinone were dissolved in 50 ml. pentan-3-one, mixed with 2 g. anhydrous copper sulfate, shaken for 3 days at ambient temperature and then worked up by the procedure described in Example 1(b). There were thusly obtained 580 mg. 3′,4′-isopentylidene-helveticoside having a melting point of 105–108° C.

Example 4.—3′,4′-isopropylidene-helveticosol 1 g. helveticosol and 6 g. zinc chloride were dissolved in 50 ml. acetone and allowed to stand for 5 days at ambient temperature. The resulting reaction mixture was further worked up by the method described in Example 2. There were recovered 680 mg. 3′,4′-isopropylidene-helveticosol having a melting point of 183–186° C.

Example 5.—3′,4′-isobutylidene-helveticosol 1 g. helveticosol and 6 g. zinc chloride were dissolved in 50 ml. methyl ethyl ketone and allowed to stand for 3 days at ambient temperature. The reaction mixture was then further worked up by the procedure set out in Example 2. There were thusly obtained 620 mg. 3′,4′-isobutylidene-helveticosol having a melting point of 112–115° C.

Example 6.—3′,4′-ethylidene-helveticoside 1 g. helveticoside, 10 mg. hydroquinone and 6 g. zinc chloride were dissolved in 50 ml. paraldehyde and allowed to stand for 2 days at ambient temperature. The resultant reaction mixture was then worked up by the method set out in Example 2. There were recovered 830 mg. 3′,4′-ethylidene-helveticoside having a melting point of 169–172° C.

Example 7.—3′,4′-n-propylidene-helveticoside 1 g. helveticoside, 10 mg. hydroquinone and 400 mg. zinc chloride were dissolved in 50 ml. propionaldehyde and allowed to stand for 4 days at ambient temperature. The reaction mixture was then further worked up by the method described in Example 2. There were thusly obtained 760 mg. 3′,4′-n-propylidene-helveticoside having a melting point of 157–159° C.

Example 8.—3′,4′-n-butylidene-helveticoside 1 g. helveticoside, 10 mg. hydroquinone and 400 mg. zinc chloride were dissolved in 50 ml. n-butyraldehyde and allowed to stand for 4 days at ambient temperature. The reaction mixture was then further processed by the method described in Example 2. There were recovered 590 mg. 3′,4′-n-butylidene-helveticoside having a melting point of 102–104° C.

Example 9.—3′,4′-n-propylidene-helveticosol 1 g. 3′,4′-n-propylidene-helveticoside (see Example 7) was dissolved in 80 ml. dioxan which contained 20% water. This solution was then mixed with 500 mg. sodium borohydride in 10 ml. dioxan, which also contained 20% water, and allowed to stand for 4 hours at ambient temperature. 2 N sulfuric acid was then added until the pH value amounted to 6, the reaction mixture was then diluted with 200 ml. water, extracted with chloroform, the chloroform phase washed with sodium carbonate solution and water, dried over anhydrous sodium sulfate, evaporated and the residue crystallized from chloroform-ether-petroleum ether. There were obtained 680 mg. 3′,4′-n-propylidene-helveticosol having a melting point of 108–110° C.

Example 10.—3′,4′-but-2-enylidene-helveticoside 1 g. helveticoside, 10 mg. hydroquinone and 400 mg. zinc chloride were dissolved in 60 ml. crotonaldehyde and allowed to stand for 3 days at ambient temperature. The resulting reaction mixture was then worked up in the manner described in Example 2. There were thusly obtained 630 mg. 3′,4′-but-2-enylidene-helveticoside having a melting point of 109–112° C.

Example 11.—3′,4′-isopropylidene-gitoxigenin monodigitoxoside 1 g. gitoxigenin monodigitoxoside and 6 g. zinc chloride were dissolved in 50 ml. acetone and allowed to stand for 3 days at ambient temperature. The reaction mixture was then further worked up by the method set out in Example 2. There were recovered 660 mg. 3′,4′-isopropylidene-gitoxigenin monodigitoxoside having a melting point of 201–204° C.

Example 12.—3′,4′-n-propylidene-gitoxigenin monodigitoxoside 1 g. gitoxigenin monodigitoxoside and 400 mg. zinc chloride were dissolved in 50 ml. propionaldehyde and allowed to stand for 3 days at ambient temperature. The reaction mixture was then further worked up by the method described in Example 2. There were recovered 630 mg. 3′,4′-n-propylidene-gitoxigenin-monodigitoxoside having a melting point of 183–185° C.

Example 13.—3′,4′-n-propylidene-lanadoxin 700 mg. 3′,4′-n-propylidene-gitoxigenin monodigitoxoside (see Example 12) were dissolved in 3.5 ml. pyridine and admixed dropwise, at ambient temperature, with 20 ml. of a mixture of formic acid and acetic anhydride (1:1). After 60 minutes, the reaction mixture was diluted with 250 ml. water, extracted with chloroform, the chloroform phase evaporated in a vacuum and the residue crystallized from chloroform-petroleum ether. There were recovered 520 mg. 3′,4′-n-propylidene-lanadoxin having a melting point of 149–152° C.

Example 14.—3′,4′-isopropylidene-lanadoxin 700 mg. 3′,4′-isopropylidene-gitoxigenin monodigitoxoside (see Example 11) were dissolved in 3.5 ml. pyridine and reacted, in the manner described in Example 13, with formic acid-acetic anhydride (1:1). Thereafter the reaction mixture was further processed. There were obtained 580 mg. 3′,4′-isopropylidene-lanadoxin having a melting point of 189–191° C.

Example 15.—3′,4′-isopropylidene-16-acetyl-gitoxigenin monodigitoxoside 500 mg. 3′,4′-isopropylidene-gitoxigenin monodigitoxoside (see Example 11) was dissolved in 5 ml. pyridine, admixed with 2.5 ml. acetic anhydride, allowed to stand for 24 hours at ambient temperature, diluted with water, extracted with chloroform, the chloroform phase evaporated and the residue crystallized from acetone-ether. There were thusly obtained 430 mg. 3′,4′-isopropylidene-16-acetyl-gitoxigenin monodigitoxoside having a melting point of 186–189° C.

Example 16.—3′,4′-isopentylidene-helveticosol 1 g. helveticosol and 6 g. zinc chloride were dissolved in 50 ml. pentan-3-one and allowed to stand for 5 days at ambient temperature. The reaction mixture was then worked up by the procedure described in Example 2. There were thusly obtained 650 mg. 3′,4′-isopentylidene-helveticosol having a melting point of 101–103° C.

A series of comparative experiments was carried out to evaluate the effectiveness of the compounds of the invention as cardiac glycosides. Helveticoside and helveticosol are highly active cardiac glycosides. Their effectiveness, however, is limited by their restriction to intravenous administration. The object of the test procedures was to evaluate the resorption properties of the compounds of the invention as compared to these known compounds. The criterion of the effectiveness of the test compounds when administered enterally was the determination of that period of time which following intraduodenal injection of the compounds to guinea pigs resulted in ventricular extrasystoles and cardiac arrest.

In addition to the above comparative substances, there was employed the gitoxigenine-monodigitoxoside, a known compound which is almost totally ineffective even when administered by the intravenous infusion route. With respect to this compound, it was selected for the double purpose of obtaining both an effective as well as a readily absorbable glycoside by way of semi-synthetic modification.

Test procedure

Guinea pigs which had been subjected to urethane anesthesia were employed in the tests. A canula was fixedly inserted into the duodenum above the bile-duct juncture. The test glycosides were then intraduodenally injected in the dosages as set forth in the table which follows. In each case, 10 ml./kg. of an aqueous solution containing 1% methylcellulose and 5% dimethylacetamide was employed as vehicle for the test compounds. The EKG was followed on the oscilloscope and the exact point was determined at which the first ventricular extrasystoles occurred. If, for a period of 4 seconds no EKG pattern could be observed, it was established that cardiac arrest had occurred.

On an average, there were six animals used per substance and dose.

The following compounds were employed in the test procedures:

A—helveticoside
B—helveticosol
C—gitoxigenin monodigitoxoside
D—3′,4′-isopropylidene-helveticoside
E—3′,4′-isobutylidene-helveticoside
F—3′,4′-isopentylidene-helveticoside
G—3′,4′-isopropylidene-helveticosol
H—3′,4′-isobutylidene-helveticosol
I—3′,4′-isopropylidene-16-acetyl-gitoxigenin-monodigitoxoside
J—3′,4′-isopentylidene-helveticosol
K—3′,4′-n-propylidene-helveticoside
L—3′,4′-isopropylidene-lanadoxin
M—3′,4′-ethylidene-helveticoside
N—3′,4′-n-propylidene-lanadoxin

TABLE

| Compound: | Dose (mg./kg. i.d.) | Min. Until Onset of— | |
|---|---|---|---|
| | | Extra-Systoles | Heart Stoppage |
| A | 5 | 57 (4/6) | 110 (4/6) |
| | 10 | 20 | 67 |
| B | 5 | 36 (3/6) | 88 (3/6) |
| | 10 | 27 | 61 |
| C | 20 | Inactive | Inactive |
| D | 5 | 9 | 47 |
| E | 5 | 15 | 55 (2/4) |
| F | 5 | 22 (3/4) | 65 (2/4) |
| G | 5 | 5 | 14 |
| H | 5 | 10 | 22 |
| I | 5 | 18 (7/8) | 31 (4/8) |
| J | 5 | 8 | 23 (5/6) |
| K | 5 | 23 (5/7) | 79 (5/7) |
| L | 1 | 17 | 30 |
| M | 5 | 14 (2/6) | 41 (2/6) |
| N | 0.7 | 26 | 31 |

As can be seen from the table upon intraduodenal administration of 5 mg./kg. of helveticoside and helveticosol, only some of the test animals demonstrated the poisoning symptoms characteristic of heart glycosides. The number given in parentheses in the table indicate the number of the test animals which exhibited the above-referred to symptoms. Only following intraduodenal administration of 10 mg./kg. of helveticoside and helveticosol did all guinea pigs demonstrate symptoms evidencing that extrasystoles and cardiac arrest had occurred. Gitoxigenine-monodigitoxoside had to be administered i.d. in a dose of 20 mg./kg. before it became effective.

In contrast thereto, the above-referred to symptoms were observed in all guinea pigs upon intraduodenal administration of only 5 mg./kg. of the compounds of the invention. When some of the compounds of the invention were used, doses of only 0.7 to 1.0 mg./kg. (administered i.d.) were sufficient to cause death. The more rapid resorption is further documented by the fact that the periods of time which elapsed prior to onset of extrasystoles and before cardiac arrest occurred were shorter than upon administration of twice the dose of the comparison compound.

The cyclic ethers of cardenolide digitoxoside in accordance with the invention can be administered orally in the form of tablets, pills, dragées or other compressed form, or as powders, preferably filled in gelatin capsules and the like, or also in liquid form, for instance, as aqueous solutions, syrups or the like.

The new compounds can also be administered parenterally, for instance, by subcutaneous, intramuscular or intravenous injection. For this purpose they are employed in the form of injectable solutions in water or isotonic salt solutions.

Rectal suppositories containing said compounds may also be employed for therapeutic purposes.

The cyclic ethers according to the present invention are preferably not used as such in undiluted form but are diluted with suitable diluting agents as they are conventionally used as pharmaceutical carriers. Such dilution allows better and more economical use to be made thereof.

For making tablets, dragées, pills, powders, and other solid forms for medication, uniform dispersion of the active compound throughout the carrier is required. Such a fine and uniform dispersion is achieved for instance by intimately mixing and milling the cyclic ethers according to the present invention with a solid pulverulent diluent and, if required, with tableting adjuvants to the desired degree of fineness. One may also impregnate the finely pulverized, solid carrier, while milling, with a solution of the active compound in water or a suitable solvent and removing the solvent during such milling.

As solid pharmaceutical carriers, various inert pulverulent distributing agents, as they are conventionally used in the pharmaceutical industry, may be employed.

Solid diluents which are admixed to the active compounds, especially when preparing tablets, pills, dragées, and other compressed forms, or powders to be placed in capsules, or in powder packets, are the commonly used diluting agents, such as cornstarch, dextrose, lactose, sugar and the like. For making tablets and other compressed medication forms, binders, such as pectins, gelatin, gum arabic, methyl cellulose, yeast extract, agar, tragacanth, and lubricants, such as magnesium stearate, calicum stearate, stearic acid, talc and the like, are used.

The amount of cyclic ether present in such preparations may, of course, vary. It is necessary that the active ingredient be contained therein in such an amount that a suitable dosage will be ensured. Ordinarily the preparations should not contain less than about 0.1 mg. of the active cyclic ether. The preferred amount in orally administered preparations, such as tablets, powders, and the like, is between about 0.2 and about 2.5 mg. and preferably between about 0.5 and about 1.25 mg. of the active compound. About 0.5 mg. per tablet weighing 0.2 g. have proved to be especially useful.

The cyclic ethers of the invention are cardioactive compounds and are indicated for the routine treatment of congestive heart failure. They are characterized by an unusually wide therapeutic range, the average effective dose approximating less than ⅓ the average toxic dose. Because of this unique characteristic clinically digitalis-refractory patients can be effectively and safely treated with the instant compounds.

The compounds clinical activity is uniform and its dosage, expressed in terms of weight, is predictable.

The compounds when orally administered are well absorbed, their action is prompt, and their rate of elimination or dissipation relatively rapid, so that symptoms of toxicity, should these occur, are not likely to persist for unduly long periods.

The compounds are also indicated in atrial flutter, atrial fibrillation, especially with cardiac decompensation, rheumatic heat disease, failure associated with arteriosclerosis and hypertension, valvular diseases or myocardial degenerative disease and auricular fibrillation and paroxysmal tachycardia without heart failure.

While information has been given above with respect to administration and dosage, the compounds therapeutic effect should and can be readily assessed by the physician. Dosage should be adjusted to the requirement of the individual patient.

We claim:

1. A compound having the formula:

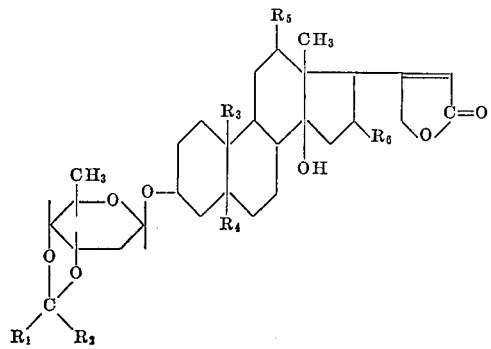

wherein $R_1$ is a member selected from the group consisting of hydrogen, and lower alkyl, $R_2$ is a member selected from the group consisting of lower alkyl, lower alkenyl and lower alkynyl, $R_3$ is a member selected from the group consisting of methyl, aldehyde, methylol and acylated methylol, wherein acyl designates a lower aliphatic carboxylic acid radical, $R_4$ is a member selected from the group consisting of hydrogen and hydroxyl, and $R_5$ and $R_6$ are each a member selected from the group consisting of hydrogen, hydroxyl and lower acyloxy.

2. A compound according to claim 1 designated 3',4'-isopropylidene-helveticoside.

3. A compound according to claim 1 designated 3',4'-isopropylidene-helveticosol.

4. A compound according to claim 1 designated 3',4'-isobutylidene-helveticosol.

5. A compound according to claim 1 designated 3',4'-isopentylidene-helveticosol.

6. A compound according to claim 1 designated 3',4'-isopropylidene-lanadoxin.

7. A compound according to claim 1 designated 3',4'-n-propylidene-lanadoxin.

References Cited

Schaumann et al., "Chem. Abst.," vol. 65, 1966, p. 7808 f.

LEWIS GOTTS, Primary Examiner

JOHNNIE R. BROWN, Assistant Examiner

U.S. Cl. X.R.

424—182

UNITED STATES PATENT OFFICE
CERTIFICATE OF CORRECTION

Patent No. 3,476,742 November 4, 1969

Wolfgang Voigtlander et al.

It is certified that error appears in the above identified patent and that said Letters Patent are hereby corrected as shown below:

Column 3, line 11, "power" should read -- powder --; line 61 "strophanthidine-β-digitoxoside" should read -- strophanthidine-D-digitoxoside --.

Signed and sealed this 19th day of May 1970.

(SEAL)
Attest:

Edward M. Fletcher, Jr.
Attesting Officer

WILLIAM E. SCHUYLER, JR.
Commissioner of Patents